United States Patent Office 3,651,112
Patented Mar. 21, 1972

3,651,112
POLYMERIC ORGANO ALUMINUM SUBSTANCES
Hansjoerg Sinn, Harksheide, Helmut Hinck and Hans Friedrich Gruetzmacher, Hamburg, and Friedhelm Bandermann, Schenefeld, Germany, assignors to Badische Anilin- & Soda-Fabrik Aktiengesellschaft, Ludwigshafen (Rhine), Germany
No Drawing. Filed Oct. 8, 1968, Ser. No. 765,995
Claims priority, application Germany, Oct. 12, 1967, P 17 20 313.3
Int. Cl. C08g 33/20; C07f 5/06
U.S. Cl. 260—448 A    2 Claims

ABSTRACT OF THE DISCLOSURE

A new polymeric organo aluminum substance is described; it has essentially the structural formula:

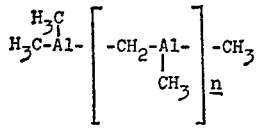

wherein $n$ denotes an integer of at least 2, the upper limit being practically infinity. The substance and branched derivatives thereof may be prepared by dissolving bicyclopentadienyltitanomonomethyl chloride in trimethyl aluminum and the whole kept thermostatically at −50 to 200° C. while excluding oxygen and water and evolving methane.

---

In accordance with the present invention a new polymeric organo-aluminum compound is disclosed.

The new substance has essentially the empirical formula $C_2H_5Al$.

The structural formula of the new substance is essentially

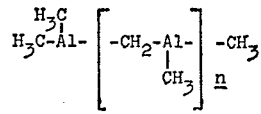

in which $n$ denotes an integer of from 2 almost to infinity, particularly from 5 to 5,000 and especially from 10 to 1,000.

The member

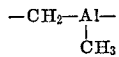

of the new substance is essentially present in an unbranched chain. Additionally the member

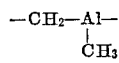

may exhibit, in an insignificant number, branchings by the replacement of one hydrogen atom of the —CH$_2$— group by the group:

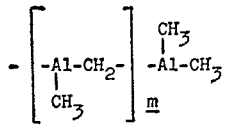

in which $m$ may denote zero or an integer up to practically infinity, particularly from 5 to 5,000 and more particularly from 10 to 1,000. The member

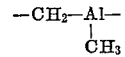

may also exhibit, also to an insignificant extent, branching by replacement of the —CH$_3$ group by the group

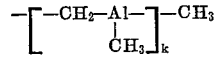

in which $k$ denotes one of the integers from 1 upward, particularly from 5 to 5,000 and more particularly from 10 to 1,000.

By decomposition analysis with deuterium chloride it is determined as a result of the formation of D$_3$CH and the volume contraction observed that polymers—particularly aged ones—also contain structural elements of the type

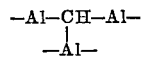

Structural elements of the type

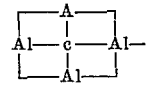

only occur to a minor extent (CD$_4$ traces detectable).

The new polymeric organoaluminum substance is practically insoluble in liquid hydrocarbons and is swellable in liquid aromatic hydrocarbons. It is solid, non-volatile and has an extremely high aluminum content for an organoaluminum compound. In other respects it has the conventional chemical properties of organoaluminum substances; for example it will react with oxygen, water and protonactive compounds.

The new substance is outstandingly suitable, by reason of its properties, as an organoaluminum component in Ziegler catalysts. It is also possible to obtain dideuteromethane in high yield therefrom in a simple manner by reaction with heavy water or deuterium chloride.

As far as Ziegler catalysts are concerned, the new substance is particularly suitable for synthesizing the types known as inverse types; whereas in conventional Ziegler catalysts the transition metal component is present as the carrier phase onto whose surface the organoaluminum component (which is generally volatile) is chemisorbed, the new substance is suitable itself as the carrier phase, i.e. it is capable of chemisorbing the transition metal component thereon. Owing to the swellability of the new substance it is thus possible to chemisorb the transition metal component not only on the surface but also, by penetration, in the interior of the substance.

The new substance may be prepared in a simple manner. One method comprises "polycondensing" trimethyl aluminum by catalysis with a transition metal compound, for example a titanium compound, with elimination of methane. The amount of transition metal compound may be from about 0.001 to 20%, particularly from about 0.1 to 10%, by weight with reference to trimethyl aluminum. The molecular weight of the new substance thus obtainable is inversely proportional to the amount of transition metal compound used. In the method of production in question, methane is formed so that reaction is complete when practically no more methane is evolved. The reaction itself may be carried out within a wide temperature range, for example from −50° to +200° C.; it is preferable to use temperatures of from 0° to 80° C.

A method of production of the new substance which has proved to be suitable is for example as follows:

While excluding oxygen and water, 0.01 mole of bicyclopentadienyltitanomonomethyl chloride is dissolved in 1 mole of trimethyl aluminum under an atmosphere of argon, the whole being thermostatically controlled at 25° C. A relatively weak evolution of methane immediately commences which after about two hundred hours suddenly becomes vigorous and after about three hundred hours ceases. The evolution of methane is accommpanied by an increase in the viscosity of the reaction material so that the latter solidifies towards the end of the reaction while at the same time foaming up. At this point in time about 0.8 mole of methane has been disengaged per mole of trimethyl aluminum used. Further methane is only developed very slowly by the solid substance. The solid material obtained is powdered in an argon atmosphere, freed from volatile constituents by vacuum treatment and from soluble constituents by extraction with boiling benzene. These soluble constituents orginate particularly from the titanium compound or derivatives thereof. The new substance is obtained in this way in a yield of 70% of the theory (depending on the sharpness with which the extractive fractionation of the low molecular constituents is carried out).

The substance has the formula $C_2H_5Al$ according to elementary analysis. When it is decomposed with deuterium chloride, monodeuteromethane and dideuteromethane are formed in the molar ratio 1:1, together with traces of trideuteromethane. Reaction with deuterium chloride is, as expected, accompanied by a contraction in volume because in the cleavage of the —Al—$CH_2$—Al— grouping 2 moles of deuterium chloride are required for disengaging 1 mole of dideuteromethane. The decomposition residue is aluminum chloride.

We claim:

1. A process for the production of polymeric organoaluminum compounds having essentially the structural formula:

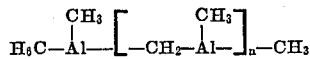

in which $n$ denotes an integer from 10 to 1,000, wherein a mixture of trimethyl aluminum and bicyclopentadienyltitanomonomethyl chloride in an amount of from 0.001 to 20% by weight with reference to trimethyl aluminum is kept at a temperature of from 0° to 80° C. while methane is evolved.

2. A process as claimed in claim 1 wherein 0.01 mole of bicyclopentadienyltitanomonomethyl chloride is dissolved under an atmosphere of argon in 1 mole of trimethyl aluminum and the whole is kept thermostatically at 25° C. while excluding oxygen and water.

References Cited
UNITED STATES PATENTS

| | | | |
|---|---|---|---|
| 3,052,660 | 9/1962 | Osgan | 260—93.7 |
| 3,149,136 | 9/1964 | MacMillan et al. | 260—448 |
| 3,180,837 | 4/1965 | MacMillan et al. | 260—448 |
| 3,375,235 | 3/1968 | D'Alelio | 260—448 |

OTHER REFERENCES

Ziegler et al., 54 Chemical Abstracts 8609 (1960).
Bartelink et al., 58 Chemical Abstracts 2032 (1962).
Miotto, 59 Chemical Abstracts 10098 (1963).

SAMUEL H. BLECH, Primary Examiner

U.S. Cl. X.R.

252—429 A; 260—2 M, 33.6 R, 94.9 B, 676 R